(12) United States Patent
Secker-Walker et al.

(10) Patent No.: US 11,398,236 B2
(45) Date of Patent: Jul. 26, 2022

(54) INTENT-SPECIFIC AUTOMATIC SPEECH RECOGNITION RESULT GENERATION

(71) Applicant: Amazon Technologies, Inc., Seattle, WA (US)

(72) Inventors: Hugh Evan Secker-Walker, Newburyport, MA (US); Aaron Lee Mathers Challenner, Cambridge, MA (US); Ariya Rastrow, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 64 days.

(21) Appl. No.: 15/929,796

(22) Filed: May 21, 2020

(65) Prior Publication Data

US 2020/0388282 A1 Dec. 10, 2020

Related U.S. Application Data

(63) Continuation of application No. 14/137,563, filed on Dec. 20, 2013, now Pat. No. 10,811,013.

(51) Int. Cl.
*G10L 15/22* (2006.01)
*G10L 15/26* (2006.01)

(52) U.S. Cl.
CPC .................................. *G10L 15/26* (2013.01)

(58) Field of Classification Search
None
See application file for complete search history.

(56) References Cited

U.S. PATENT DOCUMENTS

| 6,044,347 A * | 3/2000 | Abella ............... G10L 15/18 704/272 |
| 6,223,150 B1 * | 4/2001 | Duan ................ G10L 15/26 704/277 |
| 6,243,679 B1 | 6/2001 | Mohri et al. |
| 6,356,865 B1 * | 3/2002 | Franz ................ G10L 15/26 704/2 |
| 6,374,224 B1 * | 4/2002 | Horiguchi ........... G10L 13/00 704/266 |
| 7,058,575 B2 | 6/2006 | Zhou |
| 8,577,671 B1 * | 11/2013 | Barve ............ G06F 16/24573 715/752 |
| 8,700,404 B1 * | 4/2014 | Chotimongkol .... G10L 15/1815 704/257 |
| 8,762,156 B2 * | 6/2014 | Chen ................ G10L 15/183 704/275 |

(Continued)

*Primary Examiner* — Jakieda R Jackson
(74) *Attorney, Agent, or Firm* — Knobbe, Martens, Olson & Bear, LLP (57) ABSTRACT

Features are disclosed for generating intent-specific results in an automatic speech recognition system. The results can be generated by utilizing a decoding graph containing tags that identify portions of the graph corresponding to a given intent. The tags can also identify high-information content slots and low-information carrier phrases for a given intent. The automatic speech recognition system may utilize these tags to provide a semantic representation based on a plurality of different tokens for the content slot portions and low information for the carrier portions. A user can be presented with a user interface containing top intent results with corresponding intent-specific top content slot values.

20 Claims, 5 Drawing Sheets

(56) References Cited

U.S. PATENT DOCUMENTS

| | | |
|---|---|---|
| 10,276,170 B2* | 4/2019 | Gruber .................... G10L 15/22 |
| 10,417,037 B2* | 9/2019 | Gruber .................... G06Q 10/10 |
| 2003/0028883 A1* | 2/2003 | Billmaier ............. H04N 21/441 |
| | | 725/6 |
| 2004/0117189 A1* | 6/2004 | Bennett .................... G09B 5/04 |
| | | 704/270.1 |
| 2006/0080101 A1* | 4/2006 | Chotimongkol ........ G06F 40/30 |
| | | 704/E15.026 |
| 2008/0010069 A1 | 1/2008 | Katariya et al. |
| 2011/0029301 A1 | 2/2011 | Han |
| 2013/0275899 A1* | 10/2013 | Schubert ................ B60K 35/00 |
| | | 715/765 |
| 2013/0297304 A1 | 11/2013 | Kim |
| 2013/0346066 A1 | 12/2013 | Deoras et al. |
| 2014/0040274 A1 | 2/2014 | Aravamudan |
| 2014/0081633 A1* | 3/2014 | Badaskar ............. G06F 16/438 |
| | | 704/235 |
| 2014/0244686 A1* | 8/2014 | Tran ..................... G06F 3/0482 |
| | | 707/775 |
| 2014/0257793 A1 | 9/2014 | Gandrabur |
| 2014/0309993 A1 | 10/2014 | Goussard |
| 2015/0006169 A1* | 1/2015 | Biadsy .................... G10L 15/22 |
| | | 704/235 |
| 2015/0058358 A1* | 2/2015 | Xu ........................ G06F 16/972 |
| | | 707/748 |
| 2015/0142447 A1 | 5/2015 | Kennewick et al. |
| 2015/0332672 A1 | 11/2015 | Akbacak |

\* cited by examiner

INTENT-SPECIFIC AUTOMATIC SPEECH RECOGNITION RESULT GENERATION

CROSS-REFERENCE TO RELATED APPLICATION

This application is a continuation of U.S. patent application Ser. No. 14/137,563, filed Dec. 20, 2013, which is incorporated by reference herein in its entirety.

BACKGROUND

Spoken language processing systems can process audio data of spoken user input to generate one or more possible transcriptions of what the user said. Spoken language processing systems can then identify the meaning of what the user said in order to take some action in response to the spoken input from the user. Some spoken language processing systems contain an automatic speech recognition ("ASR") module that may generate one or more likely transcriptions of the utterance. The ASR module may then come up with sequences of words, e.g., tokens, based on certain constraints. Other modules, such as a natural language understanding ("NLU") module, may then interpret the user's words based on output from the ASR module to determine some actionable intent from the user's utterance.

An ASR module may utilize various models to recognize speech, such as an acoustic model and a language model. The acoustic model is used on features of audio data to generate hypotheses regarding which words or subword units (e.g., phonemes) correspond to an utterance based on the acoustic features of the utterance. The language model is used to determine the most likely transcription of the utterance based on the hypotheses generated using the acoustic model and lexical features of the language in which the utterance is spoken. In a common implementation, the ASR module may employ a decoding graph when processing a given utterance into a sequence of word tokens allowed by the underlying language model.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Speech processing may include the following steps: audio is received from a user, speech recognition is performed to obtain the text of the user's speech, natural language understanding is performed to obtain a semantic representation, and some action is performed in response. For example, a user may say, "What is the weather in Boston?" This speech may be converted to text, the text may be converted to a semantic representation comprising an "obtain current weather" intent with a slot indicating the weather forecast for Boston is sought, and a response may be generated for the user. Generally, the step of performing natural language understanding is performed separately and after speech recognition has been performed. Generally described, aspects of the present disclosure relate to combining portions of natural language understanding together with speech recognition so that they are performed together and not separately, as well as efficiently representing the results of the speech processing to a user.

Natural language understanding relates to determining a semantic representation of a user input. Natural language understanding generally operates on text. The text may be received from a user or the text can be transcribed from a user's speech. In some implementations, a semantic representation may comprise an "intent" and one or more "slots." User intents may be classified into different categories. For example, user intents may include "purchase item/shopping list," "play music," "pause music," "obtain current weather," and "send email." Each of these intents may be only part of a semantic representation. "Slots" may be used to provide additional information. Each intent may be associated with one or more different slots. For example, the "purchase item/shopping list" intent may be associated with an "item" slot. When a user says "buy milk," the NLU module may determine that this corresponds to the "purchase item" intent with the slot "item" having a value of "milk."

Additional aspects of the present disclosure relate to presentation of a user interface ("UI") for obtaining confirmation of or corrections to a semantic representation generated by an ASR and/or NLU modules. In one embodiment, after processing a given utterance, the ASR module may deliver ASR results with one or more intents, ranked by intent likelihood or some other correlate of correctness, to the NLU module. The ASR module may produce multiple transcriptions for a single user utterance. For example, if a user says, "Play Thrift Shop by Macklemore," the ASR results may include the correct transcription as well as alternative transcriptions corresponding to alternative intents, such as the request, "Please shop for macaroni," or the request, "Please shop for mascarpone." An NLU module may thus process more than one transcription and return multiple semantic representations. For example, the above three results may correspond to a "play music" intent with a song slot of "thrift shop" and an artist slot of "macklemore"; a "purchase item" intent with an item slot of "macaroni"; and a "purchase item/shopping list" intent with an item slot of "mascarpone."

Conventional speech processing systems may display alternative speech recognition results and allow a user to select a correct result. By presenting a greater number of alternative results, it is more likely that the correct result will be included. Presenting too many results, however, may be confusing or too laborious to provide a good user experience. The present disclosure also relates to presenting results that are sorted or organized by the underlying intent to make it easier for a user to select the correct result. For example, the UI may present a list of the top-N intents that were contained in the NLU results, such as "play music" intent and "purchase item" intent. The UI may show the user each likely intent result coupled with the top choice word or words for the content slot portions. If one of the intents is the correct intent and the corresponding content slot portion is also correct, the user may approve that intent and the action will initiate. However, if one of the displayed intents is the correct intent, but the content slot portion is incorrect, the user may instead select the content portion corresponding to the correct intent. At this point, the application knows which specific intent the user desires and the UI may instead display a larger choice list for the content slot that is appropriately focused on the desired intent. For example, if the UI displays both a shopping list intent with a content slot entry of "dinner rolls" and a play music intent with a content slot entry of "Rolling in the Deep," but the user actually wished to hear "Proud Mary (Rolling on the River)," the user may select the content slot corresponding to the song title of the play music intent. The UI may then display a list containing the top choices for the song title content slot portion of the play music intent. In an alternate embodiment, the user may be presented with the top result for the intent and the corresponding content slot. The user may select either the intent or the content slot to display additional choices for the intent or content slot portions of the semantic representation.

Some aspects of the disclosure relate to combining aspects of NLU processing with ASR processing. Generally, ASR results include text, for example, in the format of a lattice or an N-best list, and the ASR results do not include information about a semantic representation of the text. In some aspects, a decoding graph for ASR (such as a finite state transducer) may be augmented with information about the underlying semantic meaning of the text. For example, portions of the decoding graph may be associated with information (e.g., metadata) indicating an intent or a slot that corresponds to the text. This association may be indicated by "tagging" the portion with the associated metadata. A tag associated with a subsequent path (e.g., a word) of the decoding graph may indicate whether the arc path corresponds to the carrier phrase portions of the intent, the content slot portions of the intent, etc. A word or phrase may be tagged as part of a specific intent, such as the play music intent, but may also be identified as part of the carrier phrase language for that intent. Other tags may indicate that a given word or word sequence is part of a content slot (e.g., a highly informative, intent-specific portion) for that specific intent. Each word may be tagged for multiple intents with additional tags corresponding to intent-specific information. These tags allow a results generator or some other component of an ASR module to generate richness into the results that it outputs to the NLU module by generating a plurality of different word tokens corresponding to individual content slots of particular intents. As the ASR results (e.g., an N-best list or lattice) that are produced using the decoding graph may also include information about the associated intents and slots, semantic representations may be derived during ASR and separate NLU processing may not be necessary.

Although aspects of the embodiments described in the disclosure will often focus, for the purpose of illustration, on a spoken language processing system processing user utterances related to playing music, one skilled in the art will appreciate that the techniques described herein may be applied to any subject or domain of spoken language processing. For example, a system implementing the features described herein may process user utterances related to phone dialing, shopping, getting directions, playing music, performing a search, and the like. In addition, aspects of the embodiments described herein focus, for the purpose of illustration, on a client device that transmits data to a networked spoken language processing system for processing. However, the systems and techniques described herein may be implemented on a single device, such as a user device that both receives spoken input and processes the input to determine the user's intent. Various aspects of the disclosure will now be described with regard to certain examples and embodiments, which are intended to illustrate but not limit the disclosure.

Speech Recognition Environment

Figure 1:
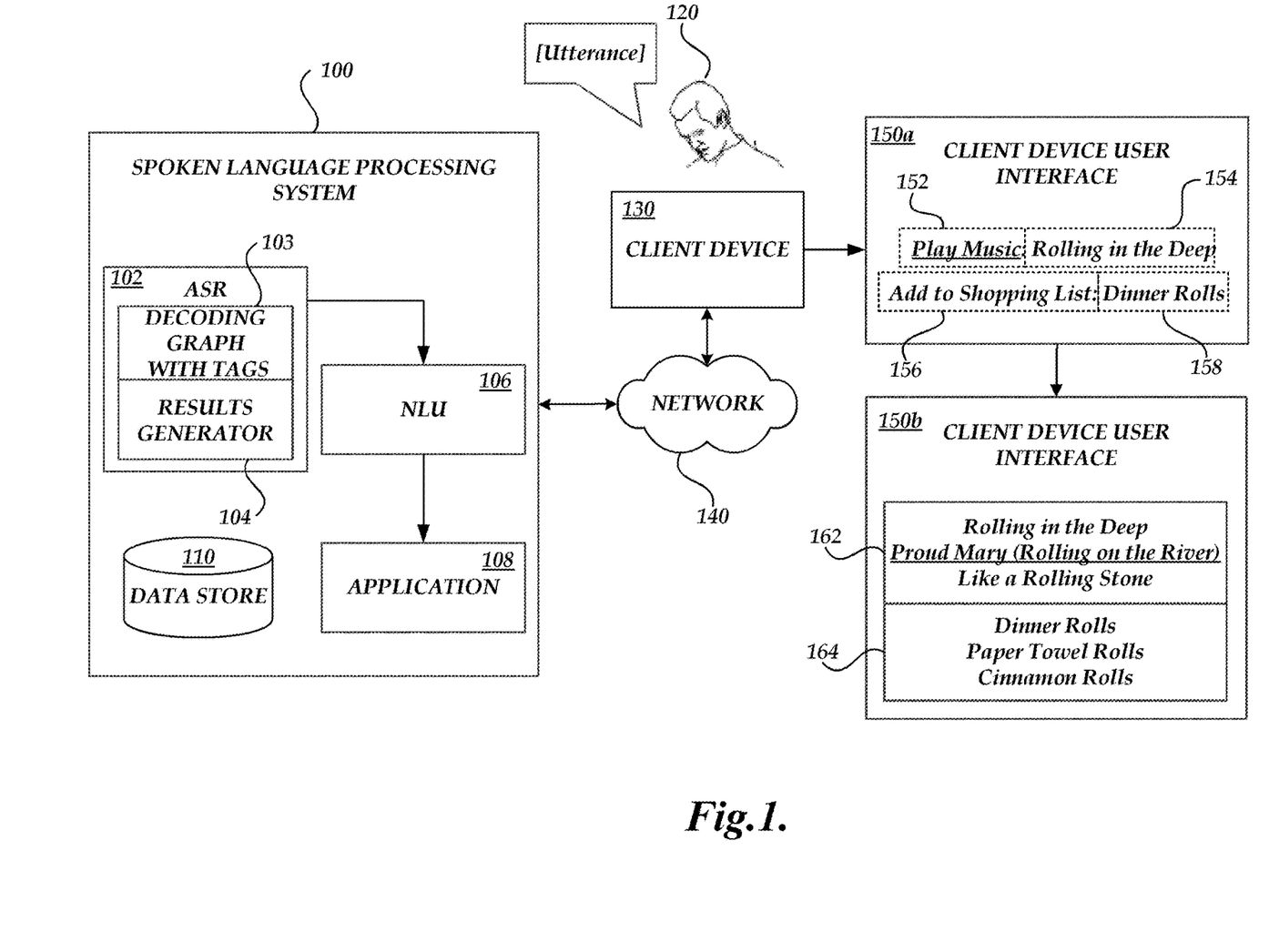
FIG. 1 is a block diagram of an illustrative spoken language processing system, showing interactions between an automatic speech recognition module and a client device user interface during and following the processing of an utterance.

Prior to describing embodiments of processes for analyzing utterances using an intent-aware ASR module, an example environment in which the processes may be implemented will be described. FIG. 1 depicts a spoken language processing system 100 showing interactions between a spoken language processing system 100 and a client device 130 during the processing of an utterance as well as the visible manifestation of these interactions. The spoken language processing system 100 illustrated in FIG. 1 can be a network-accessible system in communication with the client device 130 via a communication network 140, such as a cellular telephone network or the Internet. A user 120 may use the client device 130 to submit utterances, receive information, and initiate various processes, either on the client device 300 or the spoken language processing system 100. For example, the user 120 can issue spoken commands to the client device 130 in order to get directions or listen to music, as described above.

The client device 130 can correspond to a wide variety of electronic devices. In some embodiments, the client device 130 may be a mobile device that includes one or more processors and a memory which may contain software applications executed by the processors. The client device 130 may include a speaker or other audio output component for presenting or facilitating presentation of audio content. In addition, the client device 130 may contain a microphone or other audio input component for accepting speech input on which to perform speech recognition. Illustratively, the client device 130 may be any computing device such as a wireless mobile device (e.g. smart phone, PDA, tablet, or the like), wearable device (e.g., "smart" watch or "smart" eyewear), desktop computer, laptop computer, media player, video game console, electronic book reader, television set-top box, television (e.g., "smart" TV), or computerized appliance, to name a few. The software of the client device 130 may include components for establishing communications over wireless communication networks or directly with other computing devices.

The spoken language processing system 100 can be any computing system that is configured to communicate via a communication network. For example, the spoken language processing system 100 may include any number of server computing devices, desktop computing devices, mainframe computers, and the like. In some embodiments, the spoken language processing system 100 can include several devices physically or logically grouped together, such as an application server computing device configured to perform speech recognition on an utterance and a database server computing device configured to store records and speech recognition models.

The spoken language processing system 100 can include an ASR module 102, an NLU module 106, data store 110, and one or more applications 108. In some embodiments, the spoken language processing system 100 can include various modules and components combined on a single device, multiple instances of a single module or component, etc. For example, the spoken language processing system 100 may include a separate database server that may be configured with a data store 110; a server or group of servers configured with both ASR and NLU modules 102 and 106; and a server or group of servers configured with one or more applications 108. The ASR module 102 may consist of a variety of models and contain a decoding graph with tags 103 and a results generator 104 that generates results before sending them to the NLU module 106. In multi-device implementations, the various devices of the spoken language processing system 100 may communicate via an internal communication network, such as a corporate or university network configured as a local area network ("LAN") or a wide area network ("WAN"). In some cases, the devices of the spoken language processing system 100 may communicate over an external network, such as the Internet, or a combination of internal and external networks.

In some embodiments, the features and services provided by the spoken language processing system 100 may be implemented as web services consumable via a communication network 140. In further embodiments, the spoken language processing system 100 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The network 140 may be a publicly accessible network of linked networks, possibly operated by various distinct parties, such as the Internet. In other embodiments, the network 140 may include a private network, personal area network ("PAN"), LAN, WAN, cable network, satellite network, etc. or some combination thereof, each with access to and/or from the Internet. For example, the devices of the spoken language processing system 100 may be located within a single data center, and may communicate via a private network as described above. The client device 130 may communicate with spoken language processing system 100 via the Internet. The client device 130 may have access to the Internet via a wired or Wi-Fi connection, or via a cellular telephone network (e.g., a Long Term Evolution or LTE network).

In one embodiment, the client device 130 may receive the most likely results responsive to an utterance processed by the spoken language processing system 100. The results may be ranked by intent likelihood or some other correlate of correctness. The client device 130 may present the user 120 with a client device UI 150a detailing the most likely intent 152 or intents, 152 and 156, as one or more semantic representations. The semantic representations may indicate a possible action desired by a user, and correspond to, among others, intents, content slots, and carrier phrases. The carrier phrases may be normalized and correspond to one or more intents. The UI 150a may also detail the top content slot predictions 154 and 158 for one or more content slots of the most likely intent(s) 152 and 156. In other embodiments, the user 120 may be presented with a client device UI 150a detailing additional intents, e.g., more than two. The content slots are associated with highly informative, intent-specific portions of a user utterance. They can be used by an NLU module 106, application 108, or some other module or component of the spoken language processing system 100 to "hold" the high-information semantic elements regarding what the user 120 has said. For a given intent, there may be several possible choices of words as values for the content slot portions of that intent. The user 120 may approve the correct intent 152, which may be presented to the user by a carrier phrase corresponding to the intent, triggering the client device 130 to perform the desired action. For example, the user 120 may approve a play music intent 152, with a top choice of "Rolling in the Deep" 154 as the value for the song title content slot of the intent. An application 108 may then cause the client device 130 to begin playing the selected song.

The user 120 may also select the correct intent 152 from the given list, but the corresponding top content slot prediction 154 may not correspond to the utterance of the user 120. The client device 130 may then present the user 120 with a UI 150b detailing a plurality of different word tokens 162 demonstrating a rich selection of options for the content slot, each option corresponding to the correct intent. Returning to the example above, the user 120 may have approved the play music intent 152 but the top content slot value of "Rolling in the Deep" 154 for the play music intent 152 may have been inaccurate. The user may use the UI 150b (or some other UI providing similar functionality) to select from an extended list of top values 162 corresponding to the chosen intent 152. Potential top values that do not correspond to the chosen intent 152 may not be shown. Illustratively, the user may select the correct content slot value of "Proud Mary (Rolling on the River)." In some embodiments, the client device 130 may also present the user 120 with tokens 162 and 164 corresponding to multiple (e.g., two, three or more) intents 152 and 156. The user 120 may select the correct content slot value from the available values 162 and 164 corresponding to intent 152 and 164, respectively.

Sample Process for Presenting UIs with Intent-Specific ASR Results

Figure 2:
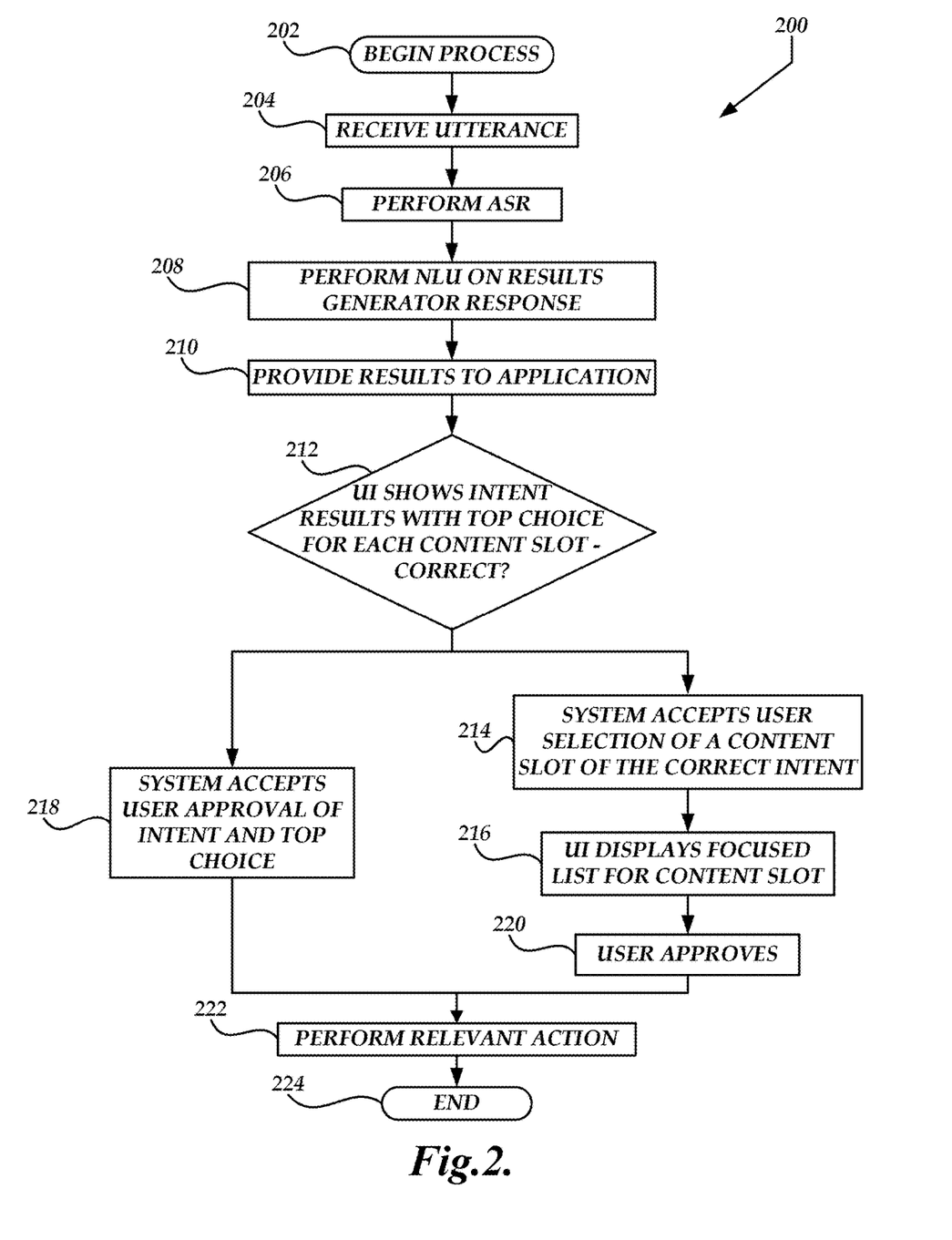
FIG. 2 is a flow diagram of an illustrative process for processing an utterance and presenting a client with one or more potential intent results along with corresponding content slot values.

FIG. 2 illustrates a sample process 200 for processing a user utterance using an intent-aware ASR module. The process 200 can include presentation of a client device UI 150 depicting one or more intent results with choices for one or more content slots.

The process 200 begins at block 202. The process 200 may begin automatically upon initiation of a speech recognition session. The process 200 may be embodied in a set of executable program instructions stored on a computer-readable medium, such as one or more disk drives, of a computing system of the spoken language processing system 100. When the process 200 is initiated, the executable program instructions can be loaded into memory, such as RAM, and executed by one or more processors of the computing system.

At block 204, the spoken language processing system 100 can receive an utterance from a client device 130. As described above, the user utterance may be a spoken command to play a recorded music file. For example, the user 120 may say, "Play me 'Rolling on the River.'" In some embodiments, the spoken language processing system 100 may not know ahead of time which intent the user 120 plans to target. The utterance may be transmitted as live streaming audio.

At block 206, the spoken language processing system 100 can perform speech recognition processing on the utterance. An ASR module 102 may utilize various models (e.g., language models, acoustic models) when determining the content of an utterance. The output of the ASR module 102 may be a lattice or N-best list of likely transcriptions of the user utterance. In some embodiments, rather than processing the utterance into textual transcriptions, the ASR module may process the utterance into one or more phonemic transcriptions (e.g., the lattice or N-best list contains the utterance transcribed into a sequence of phonemes rather than text). As described in greater detail below, the ASR module may use a decoding graph with tags or information corresponding to words, intents, content slots, and the like in order to produce results rich with appropriate recognition options for the content slots of various intents. In some embodiments, the ASR module 102 may utilize models specialized for a single intent or domain when the ASR module 102 knows the domain to which the utterance relates. Such specialized models can improve the efficiency and accuracy of the ASR module 102. In some embodiments, the ASR module 102 may utilize multiple single-domain models in parallel. This implementation may provide improved efficiency when used with, e.g., multi-core processors or when ASR processing is distributed among multiple computing devices.

At block 208, the NLU module 106 may receive the intent-specific results from the ASR module 102, such as a lattice of likely transcriptions. The NLU module 106 can identify the likely user intent based on these intent-specific results. The NLU module 106 may query a data store 110 and verify the accuracy of the named entity values. For example, the NLU module 106 can choose the highest scoring artist/song pair prior to providing the output to application 108 at block 210. One example of an NLU system that provides such features is disclosed in U.S. patent application Ser. No. 13/786,237, entitled "NAMED ENTITY RESOLUTION IN SPOKEN LANGUAGE PROCESSING" and filed on Mar. 5, 2013, which is hereby incorporated by reference in its entirety for all that it discloses. The application 108 may process the results and send them to the client device 130. If multiple intents are delivered by the NLU module 106 to the application 108, the application 108 may generate or otherwise cause presentation of a client device UI 150a to the user 120 to show that it has identified multiple (e.g., two or more) intents in response to the utterance.

At block 212, the client device 130 can present the user 120 with a UI 150a depicting each intent result 152 and 156 with a top choice (e.g., a most-likely or highest-scoring option) for each intent result's content slot(s). If one of the intent results, along with its corresponding top choice for the content slot or slots, is correct, the user 120 may approve at block 218. However, if the user interface does not show the correct entry as a choice for one or more of the intent result's content slots, the user 120 may instead select the content slot of the correct intent result at block 214. In one embodiment, the user 120 may indicate in some manner which intent is correct. For example, the user 120 may hover over the correct intent, click or tap the intent, use a touch-screen gesture, use spoken commands to select the intent, look at the intent if the device is configured with eye-movement tracking, etc. The application 108 then knows what the correct intent is and may provide the user 120 with additional choices specific to that intent. The client device UI 150b may present the user 120 with a list of top content slot choices, e.g., list 162, at block 216. The user 120 may then approve of the correct content slot choice at block 220.

Once the user 120 approves of both the intent and the content slot or slots, either at block 218 or block 220, the application 108 may perform the intended task of the user 120 at block 222. For example, the application 108 may play "Proud Mary (Rolling on the River)" utilizing the client device 130 as per the initial utterance of the user 120. The process ends at block 224.

Sample Intent-Aware ASR Module

Figure 3:
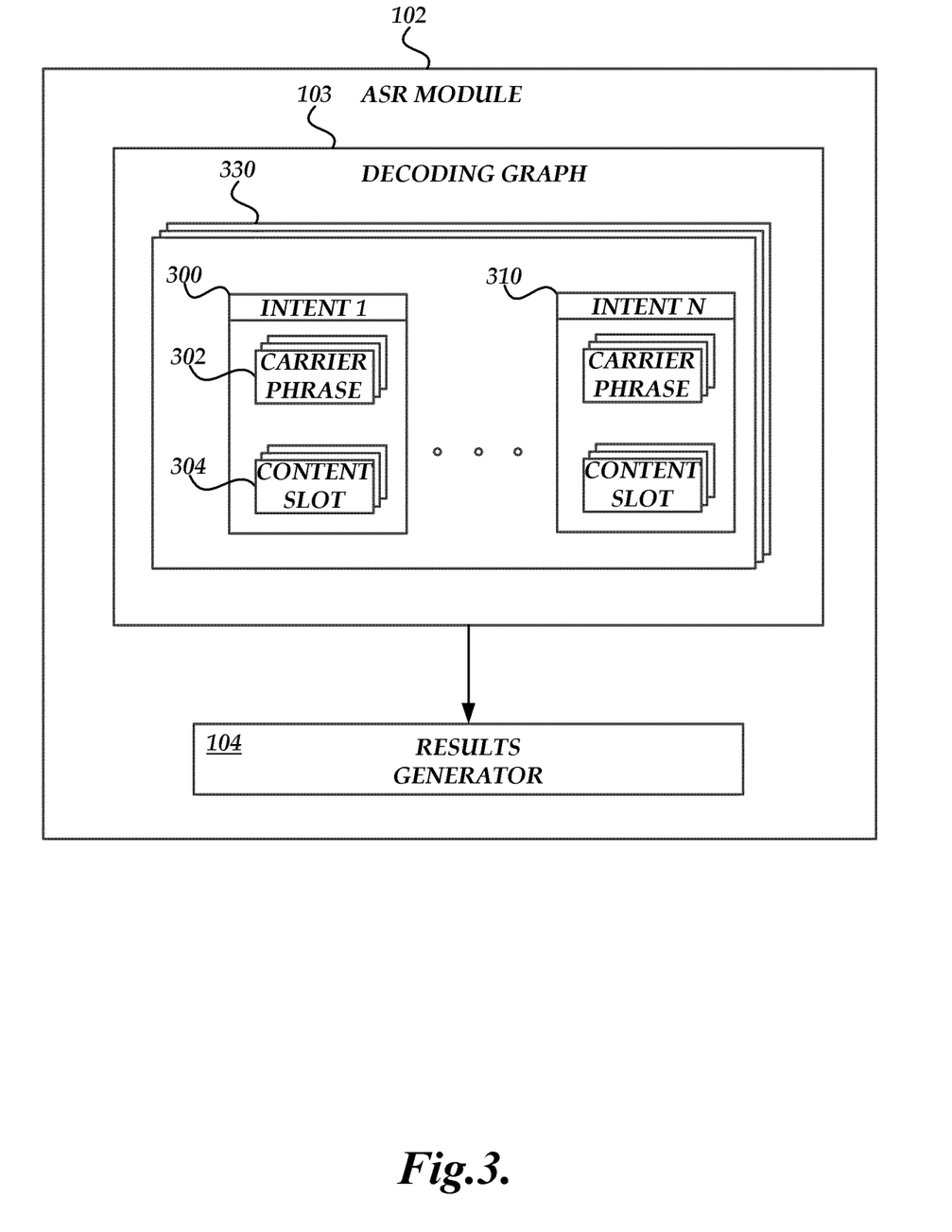
FIG. 3 is a block diagram of an illustrative automatic speech recognition module configured to provide content richness for certain content slots.

In some embodiments, the spoken language processing system 102 may include an ASR module 102 configured to provide intent-specific results for various domains. FIG. 3 is a conceptual illustration of one example of an ASR module 102 that acts as an intent-aware speech recognizer for multiple (e.g., two or more) domains. As shown, the ASR module 102 may contain a decoding graph 103 and a results generator 104. The decoding graph 103 describes the sequences of words that are possible and may consist of, be linked to, or otherwise be associated with a variety of different models. These models may include an acoustic model, grammar model, statistical language model, etc. The decoding graph 103 can be used to recognize utterances in any number of domains 130, and each domain may include one or more intents, such as intent 1 300 and intent N 310. The results generator 104 may determine which results to provide as output based on the processing done with the decoding graph 103, as described in greater detail below.

The decoding graph 103 or portions thereof may have "tags" corresponding to various types of information such as tokens, including words, intents, and values for content and carrier phrases. As described above, a semantic representation may include an intent and one or more slots. A particular intent may be associated with one or more low-information carrier phrase portions 302. The semantic representation may also include one or more high-information content slots 304. Values for these content slots may correspond to the particular intent of the semantic representation. In some embodiments, one word or word sequence in the decoding graph 103 may be tagged with metadata, such as an identifier or descriptor, indicating that the word or word sequence corresponds to a particular intent 300, such as the play music intent. The word may also be tagged with additional information. This additional information may include metadata indicating that the word is part of the carrier phrase 302 for the intent 300, or a value for the content slot 304, an identifier or descriptor of a particular content slot 304, etc.

Generally described, an arc path or some sequence or set of nodes in the decoding graph may correspond to one or more semantic representations. The semantic representation may include an intent, such as one of the illustrated intents 300 and 310. The arc for a path in the decoding graph 103 that corresponds to a particular semantic representation may be associated with tags including information relevant to that semantic representation's intent, such as an identifier or descriptor of the intent (e.g., "intent 1" or "play music"). Each portion of the graph that is specific to a given semantic representation can also have tags identifying values for carrier phrase portions 302 of the intent 300, values for content slot portions 304 of the semantic representation corresponding to the intent 300, etc. A word may be tagged as belonging to the carrier phrase 302 for a given intent 300 but may also correspond to a value for the content slot 304 for another semantic representation's intent 310. For example, when the semantic representation comprises the play music intent, the word "shop" may be tagged as a value for a song title content slot (e.g., "slot 1" or "song title")

because the musical artist Macklemore has a song named "Thrift Shop." However, for a semantic representation comprising the shopping list intent, "shop" may simply correspond to a carrier phrase portion and will be tagged as such.

A results generator 104 that produces ASR results based on paths taken through the decoding graph 103 can use the tags to identify carrier phrase portions and content slots in the results. In some embodiments, the results provided by the results generator 104 for carrier phrase portions may be highly constrained, while a rich set of options may be provided for content slots. For example, when generating an N-best list, lattice, or other type of results, the results generator 104 can add alternatives for content slot portions of a semantic representation and reduce the number of options for the carrier phrase portions of the semantic representation's intent. As described above and in greater detail below, such ASR results can provide a rich set of options for the high-information content slot portions that can be used by an NLU module, application, or some other downstream process. In addition, the results may be constrained or normalized in the carrier phrase portions because different options for the carrier phrase portions may not materially alter the meaning of the results or the recognition of the user utterance.

When processing an utterance using the decoding graph 103, history may be recorded regarding which paths and/or nodes were being considered for particular portions of the utterance. The tags for paths or nodes of the deciding graph 103 can appear in ASR decoding history as metadata, be linked to from the decoding history, or otherwise be accessible from or determined by information in the decoding history. In this way, the ASR decoding history allows the results generator 104 to identify the intent to which a particular word sequence that has been decoded likely belongs, along with locations of carrier phrase portions and content slot portions in the sequence. When building results based on the history for a particular utterance, the results generator 104 can focus on providing multiple intent-specific, content-slot-specific, or otherwise context-appropriate results for the tagged content slot portions. Thus, for each semantic representation in the results generated by the results generator 104, a plurality of different word tokens may be provided for a portion of the utterance that corresponds to the content slot for the given semantic representation's intent. The results may be ranked by intent likelihood or some other correlate of correctness. These results may be in the form of a lattice or N-best list of likely transcriptions of the user utterance. The same process may not be used for carrier phrase portions, however. For example, the results generated by the results generator 104 may include some canonical text for the carrier phrase portions.

In some embodiments, the spoken language processing system 102 may include multiple single-domain ASR modules. Each ASR module can correspond to a single domain or intent. For example, one ASR module may correspond to a "music domain" (including intents such as a play music intent), one ASR module may correspond to a weather domain, one may correspond to a travel domain, and another may correspond to a shopping domain. Each module may include its own decoding graph with tags corresponding to the carrier phrase and content slot portions of intents for the specific domain. For example, in a single-domain ASR module decoding graph corresponding to the play music intent, the word "shop" may only be tagged as corresponding to the "song title" content slot.

Figure 4:
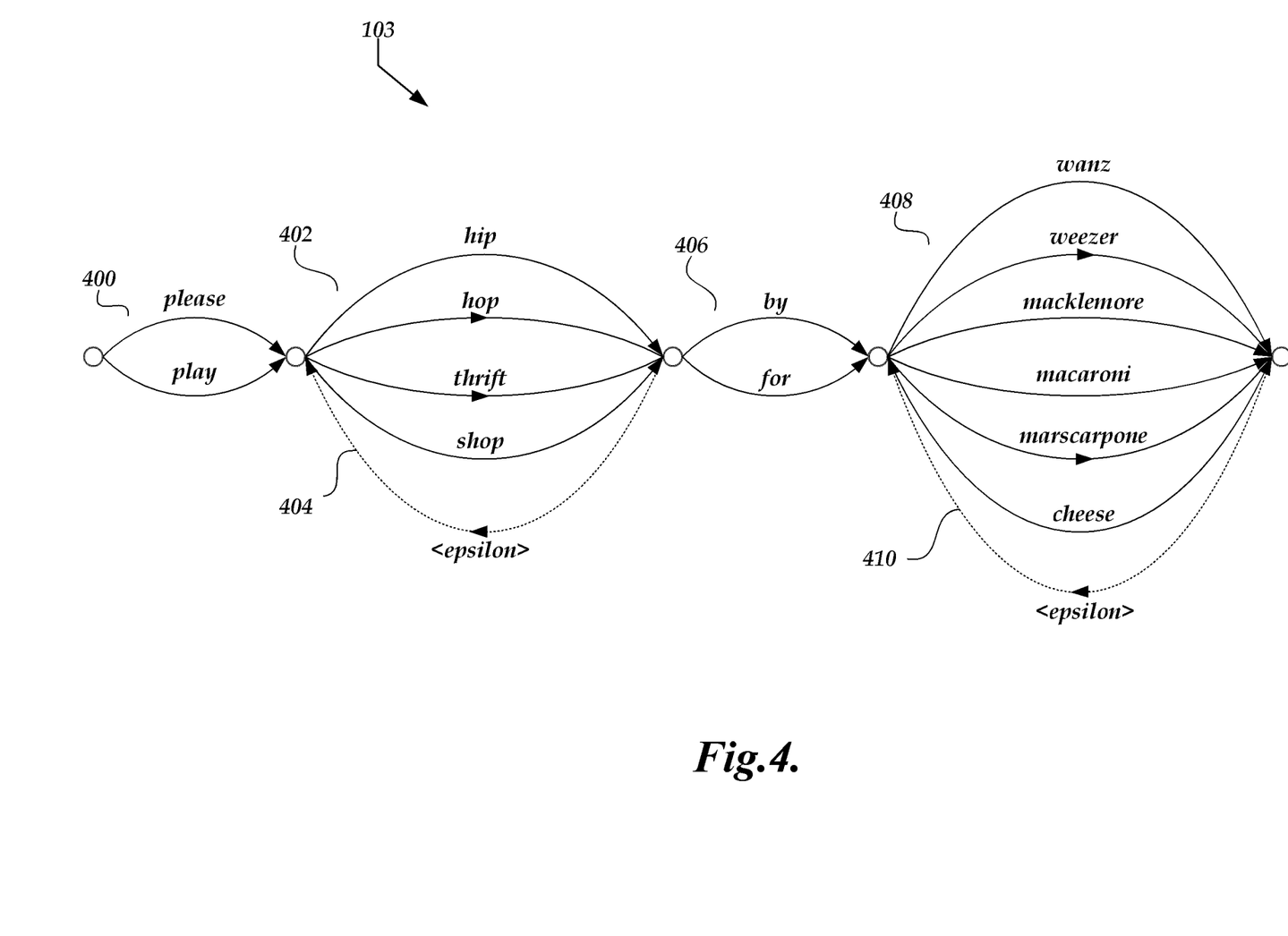
FIG. 4 is a block diagram of an illustrative automatic speech recognition module utilizing a decoding graph containing tags identifying one or more particular intents along with carrier phrases and content slots.

FIG. 4 depicts an illustrative decoding graph 103. The decoding graph 103 includes paths corresponding to various semantic representations, each of which may comprise an intent and one or more slots. The graph begins at path segment 400. Path segment 400 comprises two different arcs, one corresponding to "please" and one corresponding to "play." Both may be carrier phrases. For example, "please" may be a global carrier phrase corresponding to any intent, while "play" may be a carrier phrase corresponding to the play music intent.

The decoding graph 103 may be a finite state transducer. A finite state transducer is a graph that may include all possible utterances that may be recognized by an ASR engine. A finite state transducer may be static in that it is created before speech recognition begins and the same finite state transducer may be used for the recognition of all utterances. Multiple finite state transducers may also be dynamically linked together during the course of speech recognition, in order to create a larger finite state transducer. This larger finite state transducer may be customized, e.g., for a particular speaker or subject matter.

Path segment 402 comprises four different arcs: "hip," "hop," "thrift," and "shop." These arcs may be associated with metadata. In one example, the metadata may consist of tags. The metadata may correspond to, for example, a content slot portion for a particular semantic representation, such as a "song title" content slot of the "play music" intent. Metadata corresponding to song titles may include the words and/or tokens "hip," "hop," "thrift," and "shop." However, the metadata may also correspond to carrier phrases. For example, the word and/or token "shop" may also be associated with metadata corresponding to a carrier phrase portion of the shopping intent. Path return <epsilon>, e.g., segment 404, indicates that the results generator 104 may repeatedly follow arc path segments corresponding to content slots in order to generate a plurality of words and/or tokens corresponding to these content slots. Different paths may follow different arc path segments.

The path may include additional arcs associated with different metadata. For example, another path segment 406 may correspond to a carrier phrase portion of the given intent and may be tagged as such. Metadata corresponding to a carrier phrase portion of the play music intent may include, for example, the words and/or tokens "by" and "for."

Path segment 408 comprises six different arcs: "wanz," "weezer," "macklemore," "macaroni," "mascarpone," and "cheese." These arcs may also be associated with metadata. The metadata may correspond to, for example, an additional content slot portion of the semantic representation, such as an "artist" content slot for a semantic representation comprising the "play music" intent. Metadata corresponding to artists may include the words and/or tokens "wanz," "weezer," and "macklemore." However, the metadata may also correspond to content slot portions of other semantic representations comprising different intents. For example, the word and/or token "macaroni," "marscarpone," and "cheese" may be associated with metadata corresponding to a value for the content slot portion of the shopping intent. Path return <epsilon>, e.g., segment 410, indicates that the results generator 104 may repeatedly follow arc path segments corresponding to content slots in order to generate a plurality of words and/or tokens as values corresponding to these content slots. For example, the results generator 104 may follow the decoding graph to generate results corresponding to the utterance, "Play 'Thrift Shop' by Macklemore." One possible path may consist of arcs "play"-"thrift

[shop]"-"by"-"macklemore" The results generator may generate results for content slots corresponding to the play music intent, such as "hip," "hop," or "thrift," and "shop." The results generator 104 may determine that another likely intent is the shopping list intent and follow the path "please"-"shop"-"for"-"macaroni." These examples are included for illustrative purposes only as there may be many different ways to represent the idea that a token or word may correspond to multiple intents and be tagged with different metadata in each intent.

When the results generator 104 generates output for delivery to the NLU module 106 (or some other downstream module or process), such as an N-best list, it may determine, based on the encountered metadata, that a certain portion of the graph corresponds to a given semantic representation comprising an intent and a given portion of that semantic representation. For example, the results generator 104 may encounter a word that, based on metadata for the path segment 402 that corresponds to the position of the word in the utterance, is likely is part of a song title (e.g., "hip"). The results generator 104 may also know, based on metadata, that the word corresponds to the play music intent.

The results generator 104 may look at hypotheses or words that it was examining for some portion of the utterance, e.g., at path segment 408, and filter those words to only the "play music" intent words, or to only words tagged as "artist" (e.g., "macklemore," "wanz," and "weezer") in order to generate a plurality of tokens for that content slot. In this way, the results generator 104 can produce a list with the most likely results for a given semantic representation's intent. If the results generator 104 did not separate, filter, or choose words by intent, the results generator 104 would produce a list with very similar words, as the tokens for each intent would be all mixed together. For example, the results generator 104 would produce results corresponding to a semantic representation with the play music intent with words and/or tokens such as "macklemore," "macaroni," and "mascarpone." However, some of these words would correspond to different intents, such as the shopping list intent, and thus may actually be less likely to be correct than a more "dissimilar" sounding word corresponding to the correct intent for the semantic representation.

Speech recognition may be performed on some audio data, which may include an utterance, using a decoding graph 103 such as the one described above. The speech recognition results may include multiple transcriptions of the audio data. Each transcription may be a semantic representation associated with a different intent or may contain different values for the content slots of each utterance. Tokens, including words, within the transcriptions may correspond to different intents, content portions, or carrier portions.

In one intent-specific, non-limiting embodiment, scores (e.g., likelihoods, probabilities, or confidence scores) may be calculated for words. The scores may indicate the likelihood that a word is the correctly recognized word for a given portion of the utterance. By determining result options based on tags as described above (e.g., generating separate results for different intents or content slots), a first word with a lower score than a second word may be included in the results while the second word or phrase may be excluded from the results (or the first word may be otherwise elevated over the second word). This can be done based on a determination that the first word is part of, or associated with, values for the intent or content slot of the particular portion of the results that is currently being generated, while the second word is not. The second word may still be included in the results as a lower-ranked option, or in a portion of the results that is associated with a different intent. Returning to the example UI 150a shown in FIG. 1, the phrase "dinner rolls" (or individual words in the phrase) may be associated with a higher score than the phrase "Rolling in the Deep" (or individual words in the phrase). However, for the portion of the results associated with the "play music intent," the phrase "dinner rolls" has been excluded as a possible value. Additional results have also been generated, at least one of which corresponds to a "shopping list" intent. The phrase "dinner rolls" has been included as a value for that portion of the results.

Figure 5:
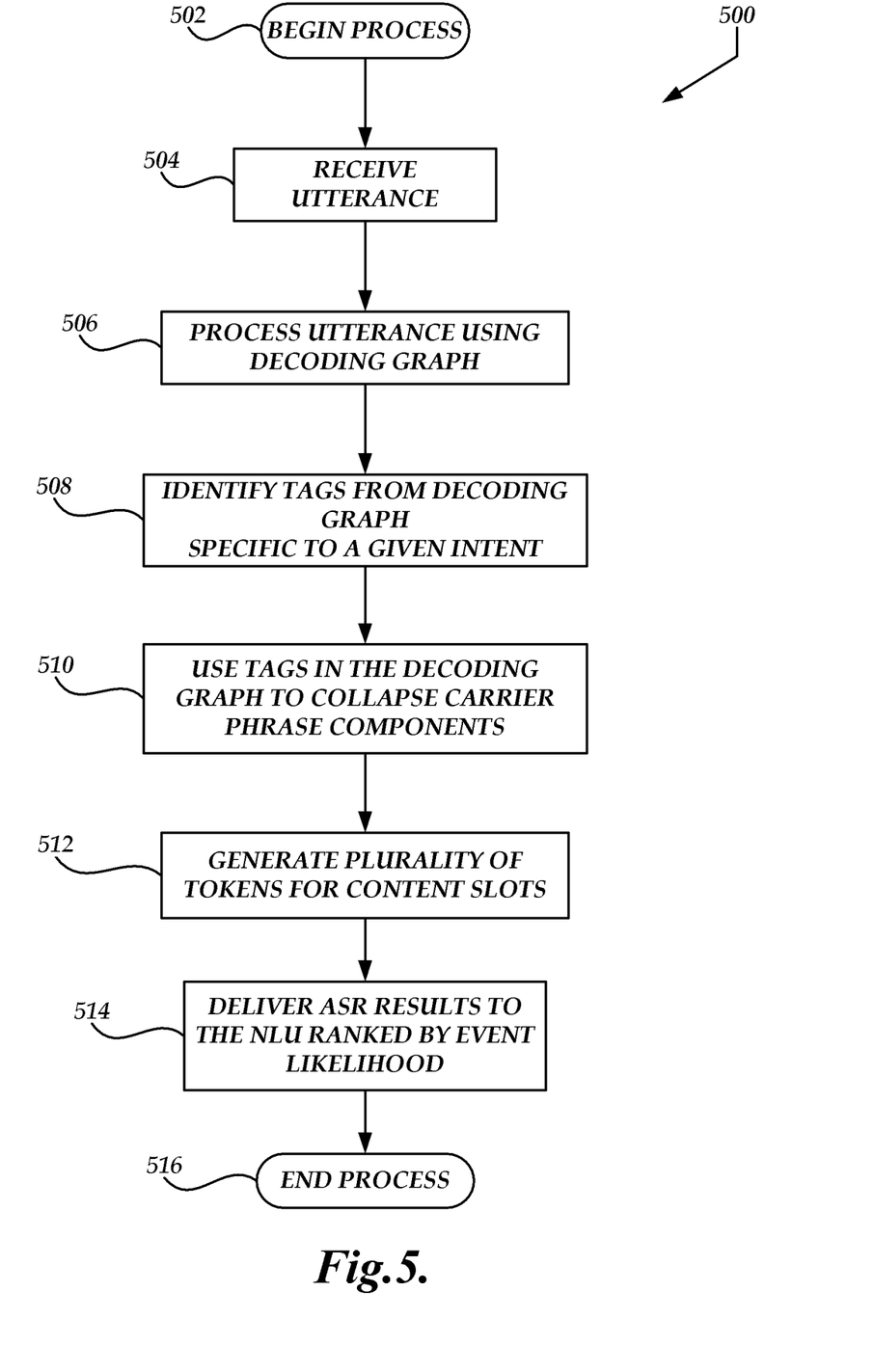
FIG. 5 is a flow diagram of an illustrative automatic speech recognition module that may process an utterance using a single decoding graph containing multiple possible intents.

FIG. 5 depicts a flow diagram of an illustrative ASR process 500 using a single decoding graph containing multiple possible intents. The process 500 begins at block 502. The process 500 may be viewed as a subset of block 206 in FIG. 2. The process 500 may be embodied in a set of executable program instructions stored on a computer-readable medium, such as one or more disk drives, of a computer device associated with the spoken language processing system 100. When the process 500 is initiated, the executable program instructions can be loaded into memory, such as RAM, and executed by one or more processors of the computing system.

At block 504, an utterance is received by the ASR module 102. As described above, the user utterance may be a spoken command to play a recorded music file. For example, the user 120 may say, "Play 'Rolling on the River' by Tina Turner." The ASR module 102 may use a single decoding graph 103 that covers several different intents that the user 120 may express through a given utterance.

At block 506, the ASR module 102 can process a given utterance from the user 120. As described in detail above, the decoding graph 103 may include tags that can be saved in the decoding history during ASR processing. For example, as the ASR module 102 traverses the decoding graph 103, determining whether a portion of the utterance likely corresponds to each arc in a particular path, tags may be encountered. In addition to storing a record of the arcs visited, scores calculated, and other such information, the tags (or some link to the arcs or tags) may be stored for use by the results generator 104, as described below.

The results generator 104 may build results using tags in the decoding history. The results generator 104 may use an algorithm for creating a list of results. The results may be provided as an N-best list, a confusion network, etc. The results generator 104 may include various results for both the carrier phrase portions and the content slot portions, but may focus on generating a rich set of results for the content slot portions.

The results generator 104 or some other module or component may, at block 508, identify the tags (e.g., in the decoding history) from each portion of the decoding graph (or some subset thereof) that was used to recognize the current utterance. The tags may identify the intent, the carrier phrase portions of the intent, and the content slot portions of the intent in order to generate various semantic representations. For example, the most likely intents may be the play music intent at node 412 followed by a shopping list intent at node 402. For the above utterance, the "play (the song)" portion or element may be tagged as a low-information or carrier phrase element, as it simply indicates what intent the user wishes to trigger, e.g., the play music intent. The song title and the artist name may be tagged as content slot portions of the intent. In the play music intent example, the play music intent may have a particular number of slots that need filling, e.g., artist, album, and song.

At block 510, the results generator 104 or some other component may use the tags in the decoding graph to collapse the carrier phrase components of a given intent (e.g., reduce the number of different words, associated with the same intent, that have been recognized for the same portion of the utterance). The results may be constrained in the carrier phrase portions because different options for the carrier phrase portions may not materially alter the meaning of the results. In many cases, the carrier phrase components for a given intent may or may not correspond to carrier phrase portions for another intent. In addition, an element tagged as a carrier component for some intent (e.g., the shopping list intent) may also be tagged as part of the content slot portion of another intent (e.g., the play music intent). Furthermore, an element tagged for a content slot of one intent may also be tagged as for the same or a different content slot of a different intent.

In the present example, the results generator 104 may collapse the potential results corresponding to the carrier phrase component of the shopping list intent but may generate a rich set of results for the content slot portion of the play music intent. For example, the word "shop" may be part of a carrier phrase component of the shopping list intent, but part of the content slot portion of the play music intent as it corresponds to a song title.

At block 512, the results generator 104 or some other component can produce a plurality of tokens for the content slots corresponding to a given intent. When the results generator produces results for more than one intent, it may produce a rich list of options for content slots of the most likely intent as well as provide richness for content slots of other intents correlating to likely choices. For example, the results generator 104 may filter words that were examined for a portion of the utterance to only those words corresponding to a likely intent, or to words tagged as corresponding to content slot portions for a given intent.

At block 514, the result generator 104 or some other component can deliver its results to the NLU module having ranked the results by the event likelihood. These results may be in the form of a lattice or N-best list of likely transcriptions of the user utterance. The results may be organized by intent. The results may comprise ranking intents. Such ASR results may provide a rich set of options for high-information content slots that can be used by the NLU module, an application, or some other downstream process. The process ends at block 516.

In another embodiment, a single-domain ASR module contains a single decoding graph corresponding to a single possible intent. The decoding graph may contain tags identifying, among other things, carrier phrase and content portions of the given intent. A results generator can produce a plurality of tokens for the content slots corresponding to a given intent while collapsing the carrier portions of the given intent. The results generator can produce results from numerous single-domain ASR modules that simultaneously (or substantially simultaneously) processed the same utterance, each for a different intent. The results generator can then deliver a top list of results, as an N-best list, a confusion network, etc., to the NLU module. Speech recognition results from the spoken language processing system 100 may include multiple transcriptions of the audio data. Each transcription may be associated with a different intent or may contain different values for the content slots of each utterance. The results may include a transcript or n-best list of transcripts for a portion of the audio data, a cumulative transcript or n-best list of transcripts, part of a lattice, part of a consensus network, any other kind of speech recognition result known to those of skill in the art, etc. The results may only include transcriptions associated with a specific intent.

ADDITIONAL EMBODIMENTS

This invention also includes methods for taking advantage of multiple central processing units ("CPUs") in parallel in order to reduce latency due to processing times. This more focused training may improve accuracy both for users as a whole as well as for individual users. The ASR module may implement cross-intent prevention during the decoding by carrying intent tags forward and utilizing the tags to make decisions about which decoder arcs to explore. The invention may also use separate CPU resources, or threads, for each intent being processed, while sharing a decoding graph as well as the acoustic scoring across all threads. The invention may examine what intents are most likely to correspond to a user's utterance in order to determine which intents or domains are assigned to different threads working in parallel.

The invention may allow for improvements to the acoustic models used for ASR, the language model used for ASR, the NLU intent-classifier models, the NLU entity-resolution models, the user-interface models covering user-interface behavior that may be automatically learned, and other models used for ASR, NLU, and user-interface that are known to those of skill in the art. The invention also allows for more focused discriminative training, both for a global static speech model and for user-specific speech models. The invention may allow for improvements within intent modeling as there may be less focus on carrier phrase regions and more focus on content slot regions. The invention may allow for improvements in cross-intent discrimination. For cross-intent discrimination, there may be more focus on carrier phrase regions. The invention may also aid in learning cross-pruning thresholds. Additionally, the invention may be used to improve other features in a global model, such as adjusting results based on the time of day or based on trending social data. Locally, the invention may use statistics regarding user results and implicit or explicit feedback regarding model success, user browsing habits, movie viewing, etc. The invention may also allow for short-term updates and model refinements based on trends observed in other media.

The invention may also use intent-specific richness to discriminatively adapt the static speech model to improve the likelihood of correct intents compared to lower-likelihood intents. The invention may further utilize the intent-specific richness to discriminatively adapt the user-specific parts of the speech model and the decoding graph. The use of intent-specific ASR modules may be complimentary to a multi-domain NLU module, allowing the NLU module to focus on using models based on specific intents.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a computer-readable memory storing an automatic speech recognition ("ASR") decoding graph comprising semantic metadata, wherein a first portion of the semantic metadata identifies a first arc of the ASR decoding graph as associated with a first intent, wherein a second portion of the semantic metadata identifies a second arc of the ASR decoding graph as associated with a second intent, and wherein a third portion of the semantic metadata identifies a plurality of tokens as associated with the first intent; and
one or more processors in communication with the computer-readable memory and programmed by executable instructions to at least:
receive audio data regarding a user request;
generate, using the ASR decoding graph and the audio data, a user interface comprising:
a first user interface element associated with a selected intent, wherein activation of the first user interface element causes change of the selected intent from the first intent to the second intent; and
a second user interface element associated with a selected content slot value, wherein activation of the second user interface element causes change of the selected content slot value from a first token of the plurality of tokens to a second token of the plurality of tokens; and generate a response to the user request based at least partly on the selected intent and the selected content slot value.

2. The system of claim 1, wherein the ASR decoding graph comprises a finite state transducer.

3. The system of claim 1, wherein the one or more processors are programmed by further executable instructions to generate speech recognition results using the audio data and the ASR decoding graph, wherein the user interface is generated based at least partly on the speech recognition results.

4. The system of claim 3, wherein to generate the speech recognition results, the one or more processors are programmed by further executable instructions to:

determine a first score using a value associated with the first arc, wherein the first score indicates a probability that the audio data is associated with the first intent; and determine a second score using a value associated with the second arc, wherein the second score indicates a probability that the audio data is associated with the second intent, and wherein the first score is greater than the second score.

5. The system of claim 3, wherein to generate the speech recognition results, the one or more processors are programmed by further executable instructions to:

determine a first score using a value associated with a third arc of the ASR decoding graph, wherein the first score indicates a probability that the audio data is associated a content slot value corresponding to the first token; and determine a second score using a value associated with a fourth arc of the ASR decoding graph, wherein the second score indicates a probability that the audio data is associated a content slot value corresponding to the second token, and wherein the first score is greater than the second score.

6. The system of claim 3, wherein the one or more processors are programmed by further executable instructions to:

select a subset of tokens from the speech recognition results, wherein each token of the subset of tokens is associated with a same content slot of the first intent;

rank the subset of tokens to generate a ranked subset of tokens; and generate a list of options selectable using the second user interface element, wherein the list of options is based on the ranked subset of tokens.

7. The system of claim 1, wherein the one or more processors are programmed by further executable instructions to generate a semantic representation of the user request using the ASR decoding graph, wherein the semantic representation comprises a carrier phrase portion associated with the first intent and a content slot portion associated with the first token, and wherein the user interface comprises a textual representation of the semantic representation.

8. The system of claim 1, wherein to generate the response, the one or more processors are programmed by further executable instructions to generate the response using the selected intent and a multi-domain natural language understanding ("NLU") subsystem, wherein the multi-domain NLU subsystem comprises a plurality of NLU models, and wherein the selected intent is associated with an NLU model of the plurality of NLU models.

9. The system of claim 1, wherein the first token is a word, a phoneme, or a phoneme in context.

10. The system of claim 1, wherein the one or more processors are programmed by further executable instructions to:

cause display of the user interface; and receive user interaction data representing selection of one of the first user interface element or the second user interface element.

11. A computer-implemented method comprising:

under control of a computing system comprising one or more computing devices configured with specific computer-executable instructions, loading, into memory of the computing system, an automatic speech recognition ("ASR") decoding graph comprising semantic metadata, wherein a first portion of the semantic metadata identifies a first arc of the ASR decoding graph as associated with a first intent, wherein a second portion of the semantic metadata identifies a second arc of the ASR decoding graph as associated with a second intent, and wherein a third portion of the semantic metadata identifies a plurality of tokens as associated with the first intent;

receiving audio data regarding a user request;

generating, using the ASR decoding graph and the audio data, a user interface comprising:

a first user interface element associated with a selected intent, wherein activation of the first user interface element causes change of the selected intent from the first intent to the second intent; and a second user interface element associated with a selected content slot value, wherein activation of the second user interface element causes change of the selected content slot value from a first token of the plurality of tokens to a second token of the plurality of tokens; and generating a response to the user request based at least partly on the selected intent and the selected content slot value.

12. The computer-implemented method of claim 11, wherein loading the ASR decoding graph comprises loading a finite state transducer.

13. The computer-implemented method of claim 11, further comprising generating speech recognition results using the audio data and the ASR decoding graph, wherein the user interface is generated based at least partly on the speech recognition results.

14. The computer-implemented method of claim 13, wherein generating the speech recognition results comprises:

determining a first score using a value associated with the first arc, wherein the first score indicates a probability that the audio data is associated with the first intent; and determining a second score using a value associated with the second arc, wherein the second score indicates a probability that the audio data is associated with the second intent, and wherein the first score is greater than the second score.

15. The computer-implemented method of claim 13, wherein generating the speech recognition results comprises:

determining a first score using a value associated with a third arc of the ASR decoding graph, wherein the first score indicates a probability that the audio data is associated a content slot value corresponding to the first token; and determining a second score using a value associated with a fourth arc of the ASR decoding graph, wherein the second score indicates a probability that the audio data is associated a content slot value corresponding to the second token, and wherein the first score is greater than the second score.

16. The computer-implemented method of claim 13, further comprising:
    selecting a subset of tokens from the speech recognition results, wherein each token of the subset of tokens is associated with a same content slot of the first intent;
    ranking the subset of tokens to generate a ranked subset of tokens; and
    generating a list of options selectable using the second user interface element, wherein the list of options is based on the ranked subset of tokens.

17. The computer-implemented method of claim 11, further comprising generating a semantic representation of the user request using the ASR decoding graph, wherein the semantic representation comprises a carrier phrase portion associated with the first intent and a content slot portion associated with the first token, and wherein the user interface comprises a textual representation of the semantic representation.

18. The computer-implemented method of claim 11, wherein generating the response comprises using the selected intent and a multi-domain natural language understanding ("NLU") subsystem, wherein the multi-domain NLU subsystem comprises a plurality of NLU models, and wherein the selected intent is associated with an NLU model of the plurality of NLU models.

19. The computer-implemented method of claim 11, wherein generating the response comprises one of: initiating a phone call, performing a shopping operation, generating directions, presenting media content, or performing a search operation.

20. The computer-implemented method of claim 11, further comprising:
    causing display of the user interface; and
    receiving user interaction data representing selection of one of the first user interface element or the second user interface element.

* * * * *